INTERFERENCE ELIMINATING ANTENNA SYSTEM

Filed March 21, 1955 3 Sheets-Sheet 1

INVENTOR.
DOUGLAS H. CARPENTER
BY
Ostrolenk & Faber
ATTORNEYS

INVENTOR.
DOUGLAS H. CARPENTER

BY

Ostrolenk & Faber
ATTORNEYS

INTERFERENCE ELIMINATING ANTENNA SYSTEM

Filed March 21, 1955 3 Sheets-Sheet 3

INVENTOR.
DOUGLAS H. CARPENTER

BY Ostrolenk & Faber
ATTORNEYS

United States Patent Office 2,804,618

Patented Aug. 27, 1957

2,804,618

INTERFERENCE ELIMINATING ANTENNA SYSTEM

Douglas H. Carpenter, Brooklyn, N. Y., assignor to JFD Manufacturing Co., Inc., Brooklyn, N. Y., a corporation of New York Application March 21, 1955, Serial No. 495,606

1 Claim. (Cl. 343—814)

This invention relates to interference eliminating antenna systems, and more particularly relates to a novel antenna system that eliminates undesired signals from directions other than that of the desired direction.

In the reception of radio, television or other communication signals, the type of signal, its frequency band, and the distance of the station and terrain between the transmitter and the receiving stations all vitally affect the clarity and strength of reception at the receiving point. Means are well-known in the receiving antenna art to concentrate the directivity and sensitivity of an antenna system to a particular direction and band of frequencies it is desired to receive at the installation. Nevertheless, when interfering signals from other directions are sufficiently powerful, they considerably interfere with the intelligibility and clarity of the desired reception.

The present invention is particularly directed to affect substantial elimination of the undesired signals generally from directions other than that of the desired signals, in the same frequency band of reception as the desired signals. The invention is generally applicable regardless of the type of antenna receiving arrangement.

Basically, means are provided to intercept and otherwise receive in a positive sense the interfering signals from the interfering direction, as with a balancing antenna section. The reverse signals are introduced to a point of the receiving transmission line in a manner to balance out or effectively cancel the interfering signals as will be set forth in more detail. Essentially, the interfering signals are picked up with a space phase relationship electrically corresponding to that of the receiving antenna position and directed to the receiving transmission line through a balancing transmission line of equivalent overall electrical length.

Accordingly, both interfering signals are of substantially identical phase relationship when combined in the manner of the invention. The interfering signals, before being combined, are rotated essentially 180° out of phase. The attenuator is introduced at the balancing transmission line to adjust the interfering signals from it to the order of amplitude of the interfering signal in the main transmission line. The amplitude adjusted signals are thereupon combined into the main transmission line. The result is full negativing of the interfering signals at this combining point; and the desired signals continue on to the receiving station, without interference or distortion.

The principles and features of the present invention are applicable to any practical receiving antenna, whether of the uni-directional variety, bi-directional type, or omnidirectional antenna array. Furthermore, the system is directly adaptable to any type of polarization of the radiation waves, as well as to either balanced or unbalanced antenna feed systems.

Accordingly, an object of the present invention is to provide a novel receiving antenna system incorporating a balancing out means for undesired signals.

A further object of the present invention is to provide a novel balancing out system for eliminating undesired signals to an antenna emanating from a direction other than that of the desired signals.

Another object of the present invention is to provide a novel receiving antenna system incorporating a second antenna or section of the original antenna oriented in the reverse direction to the main antenna, and connected therewith through a balancing out device for interfering signals.

A further object of the present invention is to incorporate a balancing out antenna array or section with a suitable attenuator device, in association with a signal receiving antenna, to afford signal interference elimination at the main receiving antenna.

These and further objects of the present invention will become more apparent in the following description of an exemplary embodiment thereof, taken in connection with the drawings in which.

Figure 1:
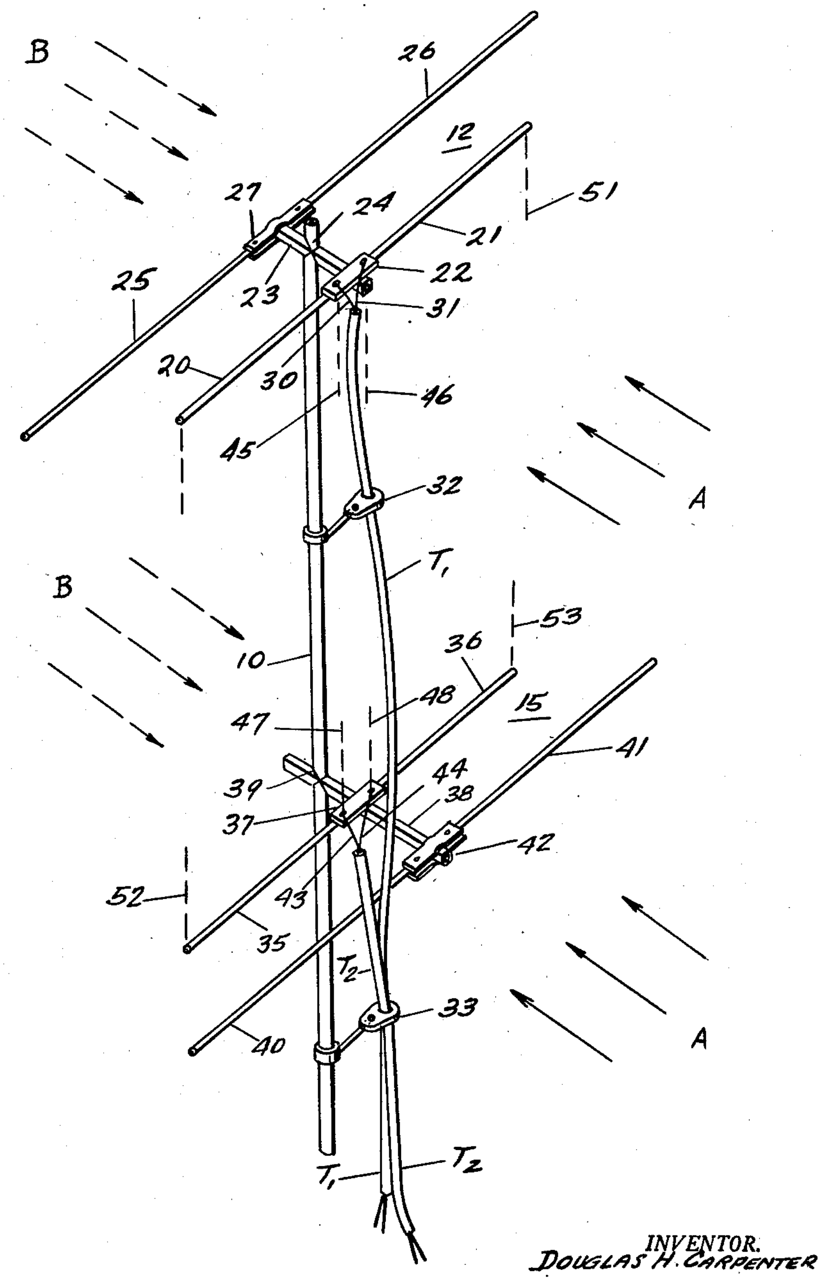
Figure 1 is a perspective illustration of an antenna array incorporating the principles of the invention.

Referring now to Figure 1, there is shown mounted on main mast 10 the main receiving antenna array 12, and a balancing antenna array 15. The receiving antenna system 12 is shown as a simple dipole with arms 20, 21 extending from insulation mounting block 22 in turn supported on a tubular member 23. Member 23 is fastened to mast 10 by suitable bracket members or wires 24. At the opposite end of supporting member 23 is mounted a reflector comprising tubular conductors 25, 26 supported in metallic bracket 27 secured to the end of supporting member 23. Bracket 27 affords an electrical interconnection between tubular reflector members 25, 26.

The simple dipole-reflector antenna receiving system 12 is suitable for the higher frequency bands such as television broadcasts, frequency modulation, and other communication signals. Antenna 12 may be proportioned for any desired frequency band, or for a selected frequency. The principles of the present invention are independent of the type of antenna receiving structure, or frequency band of reception. The simple dipole and reflector assembly 12 has been shown for exemplary purposes solely, and may be a simpler, or even more complex, array without departing from the principles and scope of the invention.

A transmission line $T_1$ extends from main receiving dipole 20, 21 through terminal connections 30, 31 individual to the dipole conductors 20, 21, respectively. The transmission line $T_1$ is a suitable dual spaced conductor lead-in, for the type of signal band of the antenna 12. It may also be co-axial or a wave guide or any type of known lead-in. Transmission line $T_1$ extends downwardly to the receiver, and is supported by stand-off insulation members 32 and 33, mounted on mast 10 in the usual practice.

The balancing antenna section 15 is shown as a simple dipole unit 35, 36 mounted on insulation block 37. Block 37 is supported on a tubular member 38 extending from the mast 10 by bracketing 39. At the side or end of supporting tube 38 opposite to that from which the receiver reflector 25, 26 is mounted, the reflector for the balancing antenna 15, namely tubular bars 40, 41, is supported. Metallic bracket 42 interconnects reflector bars 40, 41 electrically to form a suitable reflector for the balancing dipole 35, 36. A suitable transmission line $T_2$ connects the dipole 35, 36 to the system through leads 43, 44 through terminals 47, 48.

An important feature of the invention system is the mounting of receiver antenna dipole 20, 21 in substantially the same plane as dipole 35, 36 of the balancing antenna.

It is also possible, however, even if the dipoles are not in the same plane, to compensate for the phase difference in the transmission line. In this illustrated embodiment, the planes of terminal blocks 22 and 37 of the respective dipoles 20, 21 and 35, 36 are mounted in the vertical direction, as indicated by the dotted lines 45, 46, 47, 48 extending therefrom. Thus, the electromagnetic waves reaching the antennae 12 and 15 dipoles will result in signals into their corresponding transmission lines $T_1$ and $T_2$ in the same electrical phase relationship. This important feature results in a practical and efficient aspect of the interference elimination of the invention as will be set forth.

In the embodiment of Figure 1, the respective dipoles 20, 21 of the receiving antenna and 35, 36 of the balancing antenna are also in the same plane, as further indicated by the dotted lines 50, 51, 52, 53. The corresponding reflectors for the dipoles are on opposite sides thereof, as will be more fully discussed hereinafter, and for the purposes to be set forth.

The principles of the present invention, as stated are independent of the type of signals or frequency band thereof, as well as of the type of receiving antenna or transmission line utilized therefor. While a simple dipole and reflector array has been shown, a bi-directional dipole, for example, without a reflector may be used with resultant interference elimination to be described. Also, even further directional antenna arrays may be employed using directors, screen reflectors or multiple bar reflectors, etc. In place of a simple dipole, a folded dipole may be used. The invention is also applicable to omni-directional antenna arrays for the receiving system. The invention is operative where either a single frequency or a wide band of frequencies are received by the main antenna, only as limited by the response of the antennae employed.

Figure 2:
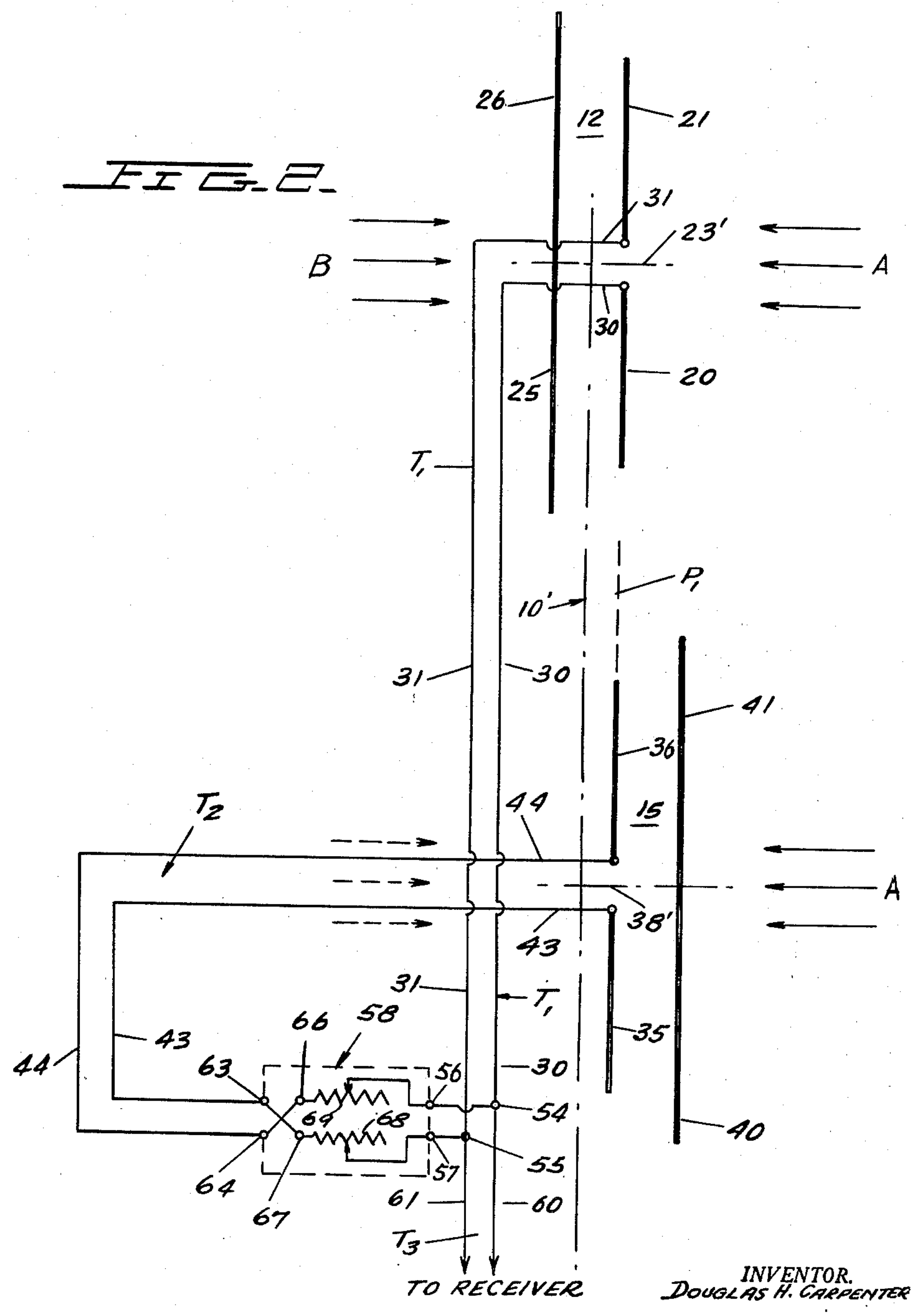
Figure 2 is a schematic diagram of the antenna array of Figure 1, in conjunction with the interfering signal balancing out means of the invention.

Referring now to Figure 2, the schematic electrical arrangement of the antenna system of Figure 1 is shown, together with the transmission lines and an attenuator constituting essential features of the invention. The antenna mast 10 is diagrammatically indicated by the dashed line 10'. The antenna take-off points to dipoles 20, 21 and 35, 36 are in the same plane, as indicated by the dotted line $P_1$. In Figure 2 the dipoles of the antennae 12 and 15 are also both in the plane $P_1$. However, it is not essential that the dipoles 20, 21 and 35, 36 be in the same plane orientation for the purposes of signal interference balancing out; it is important that transmission line take-off points be in a common plane perpendicular to the direction of the waves to the antennae to render the balancing-out system of the invention simpler and of less cost than out-of-plane.

The transmission line $T_1$ from receiving dipole 20, 21 comprises paired leads 30, 31 interconnecting. The transmission line $T_2$ from balancing dipole 35, 36 comprises paired leads 43, 44. Transmission line $T_1$ terminates in terminals 54, 55 connected to the output terminals 56, 57 of attenuator 58, and to the common transmission line $T_3$ comprising leads 60, 61 to the receiver station. Transmission line $T_2$ from balancing antenna dipole 35, 36 connects to the input terminals 63, 64 of attenuator 58.

An important aspect of the invention is to balance out the interfering signals from generally the reverse side of the receiving antenna reception direction. The main desired signals, in Figure 2, are shown by the solid arrow lines A, A impinging on the respective antennae 12 and 15. The direction of the desired signals A affords maximum receptivity at the receiving dipole 20, 21. Signals from A, through the terminal leads 30, 31, are transmitted to the receiver station by transmission line $T_1$ and its connection to the common transmission line $T_3$.

The main desired signals from A, impinging on the balancing-out antenna 15, find this antenna 15 in the reverse or minimum sensitivity orientation, with its reflector element 40, 41 ahead of the dipole 35, 36. The sensitivity of reception by the reversedly oriented balancing-out antenna 15 is at a minimum for signals from the A direction. The signals from A impinging on the dipole 35, 36 pass through to transmission line $T_2$ and to the attenuator 58 before its connection to the common line $T_3$. The combination of reversed orientation of the balancing antenna 15 to main signals A and the interposition of attenuator 58 results in little effect or reduction of the main signals as transmitted by the receiving antenna 12 to the transmission line $T_3$.

The essential function of the balancing-out antenna 15 is effective with interfering signals generally from the opposite direction to that of A, namely, such as that from the dotted line arrows B, B. The undesired signals from B, B to be balanced out before reaching the common line $T_3$ are in the frequency band of the main signals A or of its signal frequency as the case might be, in accordance with the desired reception. The signals B, B may simply be interfering signals in the frequency range, as set forth, man-made signals and/or atmospheric interference originating from the B direction.

It is to be noted that a component of the signals from B impinges upon the main receiving antenna 12 despite the interposition of the reflector 25, 26 of the exemplary embodiment. Hence, some value of interfering signal gets through to the transmission line $T_1$. In other antenna arrays, to which the invention is applicable, more or less of the interfering signal from direction B impinges and is received by the antenna 12 and passes on through transmission line $T_1$ to the common transmission line $T_3$ and to the receiver. It is the purpose of the present invention to balance out and otherwise channel out the hereinsaid interfering signals received by the main receiving antenna 12.

It is noted that the balancing-out antenna 15 has its main sensitivity and orientation in the direction of the interfering signals B. However, as will be noted in connection with Figure 3, it is not essential that the orientation of antenna 15 be at maximum sensitivity to the direction of the signals B. Essentially, the sensitivity and orientation of the balancing-out antenna to the interfering signals from B should be, and is arranged to be, higher than the corresponding sensitivity and orientation of the main antenna array 12 to the same interfering signals B. The interfering signals intercepted and otherwise efficiently received by the balancing-out antenna 15 and dipoles 35, 36 thereof are transmitted through transmission line $T_2$, with its leads 43, 44 connecting directly to the input 63, 64 of attenuator 58.

For best results it has been found that the balancing antenna section 15 be located physically either above, or below, or on either side of or behind the main receiving antenna 12, and at a minimum distance thereof of one-half wave length of the lowest desired frequency of reception. Thus, the physical distance between the axis 23' through the terminal block of receiving dipole 20, 21 and the corresponding axis 38' of balancing dipole 35, 36 should be in length at least one-half of the wave length of the lowest frequency in the band of reception for which the antenna system is designed. With terminal points of the dipoles kept in the plane $P_1$, the orientation of the balancing section 15, particularly of its receiving dipole 35, 36 can be in any space relationship about the receiving dipole 20, 21, as herein stated, as long as the distance 23' to 38' between them is at the stated minimum. The balancing section 15 also has the characteristic of greater gain in the direction back of the receiving antenna 12, and conversely, less gain in the direction facing the front of the receiving antenna.

It will thus now be understod that with a co-planar take-off of the two dipoles 20, 21 and 35, 36, the phase relationship on the common interfering signals (from direction B) passing through both transmission lines $T_1$ and $T_2$ remains constant for equivalent transmission lines. This phase changes along the length of the transmission lines but stays equal to each other along equal lengths. In the exemplary form of the invention shown in Figure 2, the actual length of the transmission line $T_1$ from dipole 20, 21 to terminal points 54, 55 is made identical with the length of the transmission line $T_2$ from its dipole 35, 36 to the input terminal 63, 64 of attenuator 58. It will thus be apparent that the phase relationship of the interfering signals or signal band on the two antennae will be identical at both terminals 54, 55 at the end of transmission line $T_1$ and terminals 63, 64 at the end of transmission line $T_2$. Where it is desired to use unequal lengths for transmission lines $T_1$ and $T_2$, one should insert a suitable delay line in the shorter transmission line, whereby the overall effect at the ends of lines $T_1$ and $T_2$ is the same phase of the signals, thus affording equal effective lengths.

In accordance with the present invention, the interfering signals are combined into the common transmission line $T_3$ to the receiver in a manner to cancel each other out, whereby the interfering signals from direction B do not enter the transmission line $T_3$ and do not reach the receiving station. For this purpose, the attenuator 58 is employed between points 54, 55 and 63, 64. The attenuator 58 in the described embodiment is resistive in nature, and comprises a potentiometer 68 and a corresponding potentiometer 69 ganged together for displacements in unison, or balance. The terminals at the input of attenuator 58 are transposed or oppositely connected to the respective potentiometers 68, 69 by connecting input terminal 63 to the potentiometer 68 at its terminal 67; and input terminal 64 to potentiometer 69 at its input terminal 66. The further connection of the output 56, 57 of attenuator 58 to line $T_1$ terminals 54, 55 is such as to effect an overall 180° phase difference between the interfering signals from transmission line $T_2$ through attenuator 58 and those at the terminal ends 54, 55 from transmission line $T_1$. Towards this end, the terminus 56 of attenuator 58, connecting through to the input terminus 64 thereof, and lead 44 of transmission line $T_2$ is in turn connected to the opposite dipole lead of the corresponding antenna 12, namely lead 30, of transmission line $T_1$ at terminus 54 thereof. Similarly, the lead 43 from the dipole section 35 of balancing antenna 15 is connected with the opposite member, namely lead 31 of hte dipole section 21 of the receiving antenna 12, through the potentiometer attenuator 68, and its output terminal 57, to terminal 55 of lead 31. The common transmission line $T_3$ has lead 60, 61 connecting directly to the terminals 54, 55 of line $T_1$ as shown in the drawing.

The attenuator 58, having resistive elements, namely potentiometers 68, 69 ganged together for unitary control, affords a desired and balanced attenuation of the signals from transmission line $T_2$, before its connection to the common transmission line $T_3$. In view of the greater sensitivity of reception of the balancing antenna 15 to interfering signals from direction B, it will be understood that the amplitude of the interfering signal at the end of transmission line $T_2$, namely at the terminal 63, 64 thereof, is greater than the amplitude of the corresponding interfering signal passing through transmission line $T_1$ and as exists at terminals 54, 55 thereof. The reason for this divergence of amplitude is inherent in the invention system by providing a greater sensitivity and gain of balancing antenna 15 to the interfering direction B, as compared to that of the main antenna 12.

As the phase of the respective signals at the end of transmission lines $T_1$ and $T_2$ is the same, the view of the co-planar pick-off of the signals from the respective antenna and the same length of the transmission lines $T_1$ and $T_2$ as aforesaid, attenuation of the signals from transmission line $T_2$ is effected to render a balancing-out or cancelling out of the signals from transmission line $T_1$ at points 54, 55. This is accomplished by the use of attenuator 58. Thus, the interfering signal amplitude at the output terminals 56, 57 of attenuator 58 is made to correspond to that at terminals 54, 55; and with the 180° phase inversion through the attenuator 58 connections, acting to cancel out or otherwise balnace-out the interfering signals as they merge at the common transmission line $T_3$ through leads 60, 61 thereof. Actually, the adjustment of attenuator 58 is effected by the operator at the receiving station, with the attenuator at the television set, or other communication receiver. Such balancing-out is directly noticeable by the quality of the received signals, whether aural, visual, or otherwise. Other types of atenuator, in addition to the resistive type, may also be used.

As heretofore set forth, the corresponding coaction of antennae 12 and 15 with respect to the desired signals from direction A are such that the balancing-out section has a negligible and at worst a fractional effect on the transmission of the main received desired signals from dipole 20, 21 through transmission line $T_1$ to the common transmission line $T_3$. The reasons are the reverse orientation of the balancing antenna 15 whereby it is normally far less sensitive to signals from the desired direction A, as well as the interposition of the high impedance attenuator setting 58 between its transmission line $T_2$ and the connection to common transmission line $T_3$. Its effect, if any, is fractional and negligible to the point where the effective balancing-out of the interfering signals from direction B in conjunction therewith affords a more practical and pleasant system of reception in the overall.

Figure 3:
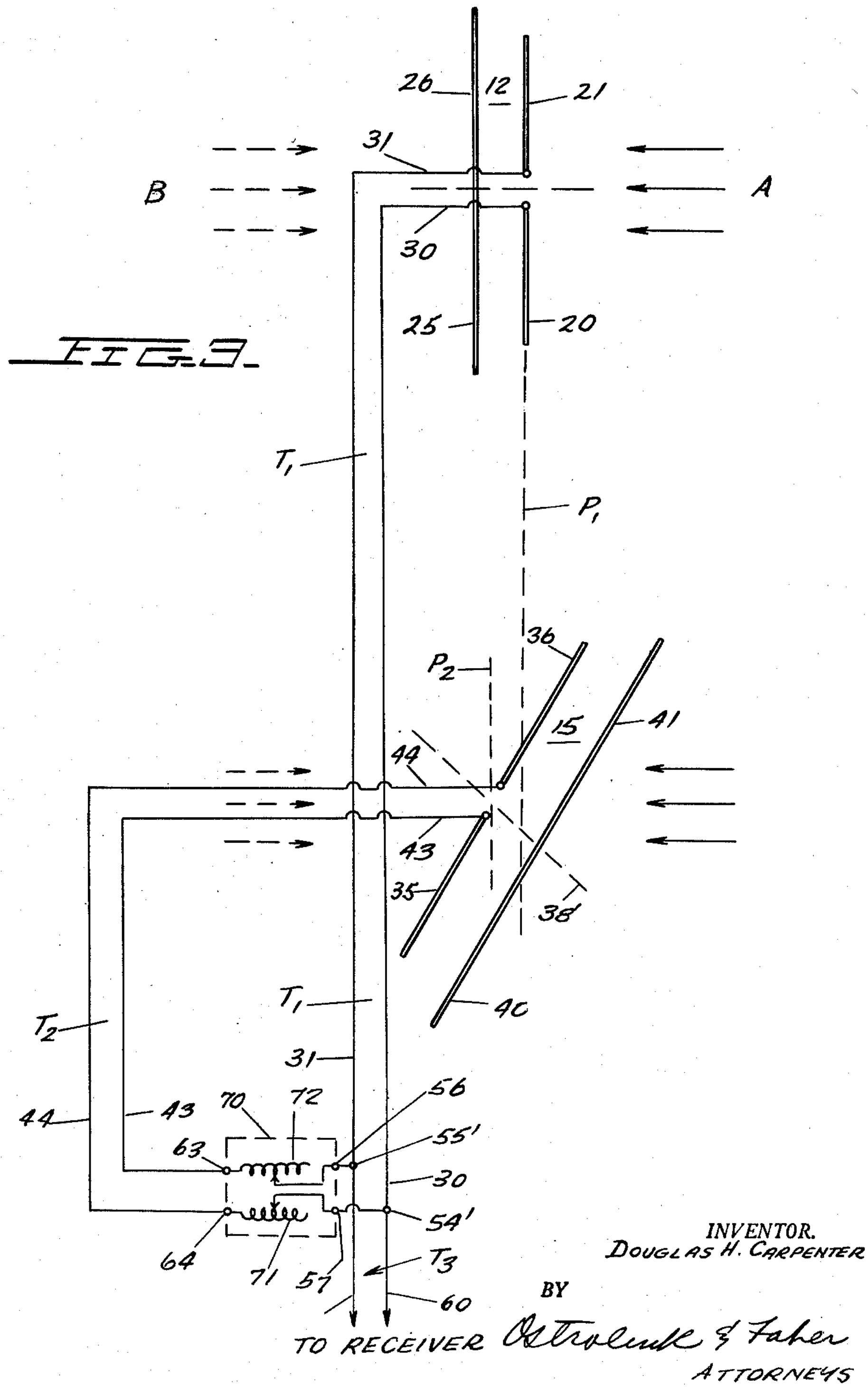
Figure 3 is a modified arrangement of the invention system.

In Figure 3 is shown a generalized version of the invention applicable to the balancing-out of interfering signals from direction B from the desired signals received from direction A. The balancing-out antenna section 15 is shown oriented at an angle with respect to the plane of dipoles 20, 21. Dipole 35, 36 of antenna 15 is at an angle with respect to the interfering signals from direction B. However, it is noted that the orientation and design of balancing-out antenna section 15 is such as to be of a greater receptivity to the interfering signals from direction B than that of the main receiving antenna 12 on the same interfering signals.

An angular orientation between balancing antenna 15 and interfering signals such as from B is effective in carrying out the principles of the invention. In fact, the invention is applicable to orientations of interference generally over the 180° sweep generally over the reverse direction (from B) as compared to the main or forward direction from the front of the receiving antenna for the desired signals (from A). This effect may also apply to signals from the forward direction as well. In other words, as long as the interfering signals as received by antenna 15 are in a greater gain relationship to that as received by the main antenna 12, the balancing-out effect through the attenuator and the transmission lines $T_1$ and $T_2$, as set forth, effectuate a diminuation and effective cancellation of the interfering signals before entering the receiver.

In the generalized application of Figure 3, the plane of the signal take-off section of balancing antenna 15, namely the plane shown by dotted line $P_2$, is displaced from the corresponding plane of the receiving antenna, namely $P_1$. The distance between the axial dipole positions 23' and 38' is still preferably at least one-half wave length of the lowest of desired reception frequency. However, the distance of the take-off sections, between planes $P_1$ and $P_2$, represents a space phase displacement of signal impingement on the respective antennae 12 and 15. Thus, the initial phase of the signals transmitted to the transmission lines $T_1$ and $T_2$ through leads 30, 31 and 43, 44, respectively, bears a phase displacement. Such phase displacement can be compensated by correspondingly altering the length of the respective transmission lines $T_1$ and $T_2$. The effective lengths of lines $T_1$ and $T_2$ provide phase correspondence to the interfering signals at the lower ends of lines $T_1$ and $T_2$. Another effective phase compensation is by using a reactive attenuator 70 in place of the resistive attenuator 58 of Figure 2. The reactive attenuator 70 contains suitable inductances 71, 72 that further contain resistance for attenuating the signals from antenna 15 and transmission line $T_2$ to the common antenna transmission line $T_3$.

In the attenuator 70 there is no 180° cross-connection between the attenuator elements 71, 72 and input terminal 63, 64. In this case, the 180° cancellation of the signals, after phase balancing and attenuation, is cross-connected with respect to the leads of the transmission lines $T_1$ and $T_2$. Thus, the output 56 of the attenuator 70 (corresponding to the phase of lead 43 of line $T_2$) is connected to the opposite corresponding lead 31 of line $T_1$ at terminal 55'. Correspondingly, the terminal 57 of attenuator 70 (corresponding to lead 44) is connected to the terminal 54' of line $T_1$. Thus, dipoles 20, 21 of antenna 12 and 35, 36 of antenna 15 are cross-connected at the output of attenuator 70 to effect cancellation of the interfering signals from lines $T_1$ and $T_2$ that are otherwise balanced in amplitude and phase at the connection points 54', 55' leading into the common transmission line $T_3$.

While this invention has been described and illustrated with the exemplary embodiments thereof, it is to be understood that the principles and features thereof are subject to modification and variation as will now be understood by those skilled in the art and that it is not intended to be limited in their application and scope except as set forth in the following claim.

I claim:

An antenna system of the character described comprising a main substantially unidirectional receiving antenna oriented to be primarily responsive to desired signals from a first direction but which receives undesired signals from a second direction in the course of its operation, a balancing substantially unidirectional receiving antenna oriented in a direction opposite from that of said main antenna to be responsive to said undesired signals but to discriminate against said desired signals, and means including a transmission line interconnecting said antennae and a common output for balancing out said undesired signals at said output, wherein each of said antennae comprises a driven dipole and a parasitic reflector, the terminals of one of said dipoles being spaced from the terminals of the other at least one-half wavelength of the lowest frequency signal to be received, and said dipoles being in the same plane, wherein said transmission line comprises a first part connecting said main antenna dipole to said output and a second part connecting said balancing antenna dipole to said output, said parts being correlated in length and interconnected to cause the undesired signals from said main and balancing dipoles to be oppositely phased at said output, including a variable lumped impedance in series with one of said parts of said transmission line.

References Cited in the file of this patent

UNITED STATES PATENTS

| | | |
|---|---|---|
| 1,350,100 | Hogan | Aug. 17, 1920 |
| 1,468,062 | Weagant | Sept. 18, 1923 |
| 1,500,476 | Vreeland | July 8, 1924 |
| 1,654,753 | Richmond | Jan. 3, 1928 |
| 1,855,184 | Fisher | Apr. 26, 1932 |
| 2,046,849 | Runge | July 7, 1936 |
| 2,051,260 | Lesh | Aug. 18, 1936 |
| 2,117,680 | Robinson | May 17, 1938 |
| 2,187,015 | Cork | Jan. 16, 1940 |
| 2,226,836 | Sinninger | Dec. 31, 1940 |
| 2,307,184 | Alford | Jan. 4, 1943 |
| 2,310,692 | Hansell | Feb. 9, 1943 |
| 2,407,659 | Fuchs | Sept. 17, 1946 |

OTHER REFERENCES

"Television Antennas, Design, Construction, Installation and Trouble Shooting Guide," by Donald A. Nelson, 2d ed., 1951, published by Howard W. Sams and Co., Inc., Indianapolis, Indiana, pages 55–57. Copy in Division 44.